(12) United States Patent
Brumitt et al.

(10) Patent No.: US 6,957,177 B1
(45) Date of Patent: Oct. 18, 2005

(54) GEOMETRIC MODEL DATABASE FOR USE IN UBIQUITOUS COMPUTING

(75) Inventors: Barrett L. Brumitt, Redmond, WA (US); Steven A. N. Shafer, Seattle, WA (US); Brian R. Meyers, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 755 days.

(21) Appl. No.: 09/657,871

(22) Filed: Sep. 8, 2000

Related U.S. Application Data

(60) Provisional application No. 60/170,285, filed on Dec. 10, 1999.

(51) Int. Cl.[7] ............................................. G06F 17/50
(52) U.S. Cl. ............................................ 703/13; 705/1
(58) Field of Search ................................ 703/22, 21, 7, 703/13; 705/1; 701/200; 345/419, 473; 382/103, 382/284, 154; 250/221; 396/20

(56) References Cited

U.S. PATENT DOCUMENTS

| | | | |
|---|---|---|---|
| 5,363,305 A * | 11/1994 | Cox et al. .................... | 701/200 |
| 5,850,352 A | 12/1998 | Moezzi et al. | |
| 6,173,066 B1 * | 1/2001 | Peurach et al. ............. | 382/103 |
| 6,366,830 B2 * | 4/2002 | Bacchi et al. ............... | 700/250 |
| 6,414,684 B1 * | 7/2002 | Mochizuki et al. ......... | 345/473 |
| 6,429,420 B1 * | 8/2002 | Babst et al. ................. | 250/221 |
| 6,456,339 B1 * | 9/2002 | Surati et al. ................ | 348/745 |
| 6,473,079 B1 * | 10/2002 | Kacyra et al. .............. | 345/419 |
| 6,510,244 B2 * | 1/2003 | Proesmans et al. ......... | 382/203 |
| 6,516,099 B1 * | 2/2003 | Davison et al. ............. | 382/284 |
| 6,542,249 B1 * | 4/2003 | Kofman et al. ............. | 356/601 |
| 6,556,783 B1 * | 4/2003 | Gelphman .................... | 396/20 |
| 6,615,112 B1 * | 9/2003 | Roos ............................ | 700/254 |
| 6,628,819 B1 * | 9/2003 | Huang et al. ................ | 382/154 |
| 2002/0116200 A1 * | 8/2002 | Cureton et al. .................. | 705/1 |

OTHER PUBLICATIONS

Papka et al., "Ubiworld: An environment integrating Virtual reality, supercomputing and design", IEEE, 1996.*

(Continued)

*Primary Examiner*—Kevin J. Teska
*Assistant Examiner*—Kandasamy Thangavelu
(74) *Attorney, Agent, or Firm*—Lyon & Harr, LLP; Richard T. Lyon

(57) ABSTRACT

A system and process for providing a geometric model database for use in an ubiquitous computing environment. In general, the geometric model database system and process is capable of accepting information about the geometric state of the environment, building a geometric model of this environment, maintaining and storing the geometric model, and handling queries about the environment's geometric state. The task of building a geometric model begins by establishing a set of entities that are of interest in the environment. An entity represents an object which exists in the physical world. In the geometric model database, an entity is represented by a coordinate frame and an extent. Extents refer to the physical size, or some service region such as a field of view, associated with an entity. The location of an entity in the physical world is defined using "measurements". In general, a measurement is simply a mathematical description of the geometric relationship between two entities. More precisely, a measurement describes the position and orientation of one entity's coordinate frame, expressed in terms of another entity's coordinate frame. Measurements originating at an entity's frame are expressed in terms of that frame. While various mathematical representations of the geometric relationship between entities could be employed, a preferred one characterizes a measurement as the relative position, and the relative orientation or heading, of two entities along with a covariance matrix which describes the uncertainty in these values.

16 Claims, 9 Drawing Sheets

OTHER PUBLICATIONS

Fox et al., Integrating information appliances into an interactive workspace >> , IEEE, May/Jun. 2000.*

R. Smith, P. Cheeseman. "On the Representation and Estimation of Spatial Uncertainty". International Journal of Robotics Research, vol. 5, No. 4, pp. 56-67, Winter 1986.

P. Newman. "On The Structure and Solution of the Simultaneous Localisation and Map Building Problem". Ph.D Thesis, Mar. 1999.

Chavand, F., Ollier, J. M., Lelandais, S., Updating the environment's geometric database in telerobotics: Determination for position-orientation of known objects, *IEEE International Conference on Systems, Man and Cybernetics*, San Antonio, Texas, 1994, pp. 1351-1356.

Lin, I-S., F. Wallner, R. Dillman, Interactive control and environment modelling for a mobile robot based on multisensor perceptions, *Robotics and Autonomous Systems*, 1996, vol. 18, pp. 301-310.

* cited by examiner

GEOMETRIC MODEL DATABASE FOR USE IN UBIQUITOUS COMPUTING

CROSS-REFERENCE TO RELATED APPLICATIONS

This application claims the benefit of a previously-filed provisional patent application Ser. No. 60/170,285 filed on Dec. 10, 1999.

BACKGROUND

1. Technical Field

The invention is related to a ubiquitous computing environment, and more particularly to a system and process for providing a geometric model database for use in aggregating information and responding to queries about the environment's geometric state.

2. Background Art

Ubiquitous computing revolves around extending computational activities beyond the current desktop model and into the environment. In future homes and offices, access to computing should be as natural as access to lighting. Users should not be required to go to a special place (i.e., the desktop) to interact with the computer. Rather, the computer should be available to interface with the user anywhere in the home or office (or more generally anywhere in an arbitrarily large environment), through whatever set of devices is available, be they fixed or carried by the user.

It is noted that the term computer is used loosely here in that the user actually would have access to a wide variety of computing and information services, which will likely employ many computers and "smart" devices such as PDA's, mobile phones, cameras, etc. For example, computing services such as web browsing, document editing, or video conferencing are envisioned. Thus, it should be understood that when the term computer is used in connection with the concept of ubiquitous computing, in actuality many computers may be involved non-exclusively in a single interactive session.

The usefulness of an ubiquitous computing system is greatly enhanced if it maintains an awareness of the users, including such things as their locations and orientation (i.e. which way they are facing). One goal of such a system would then be to understand the physical and functional relationship between the users and various I/O devices. Such knowledge could be employed to allow a user to move from room to room while still maintaining an interactive session with the computer. Through cameras, microphones and other perceptual devices or sensors, the user would always be in touch with the computer, no matter where the computer is physically located. Conversely, through displays, speakers, and other output devices, the computer will always be able to contact the user. For example, the system could track the location of a person and transfer a current computing session from a monitor in one room, to a different monitor in another room where the user enters, while the user continues to control the session via a PDA carried on his person.

As can be imagined, a fundamental unifying aspect of ubiquitous computing is a representation of the physical relationships between people, things, and devices—in other words a geometric model of the environment. To date, no satisfactory geometric modeling program exists.

The present invention provides this needed geometric modeling program in the form of a dynamic database that maintains information about the physical relationships between users, various I/O devices and sensors, as well as passive things in the world such as furniture, doors and walls.

It is noted that in the remainder of this specification, the description refers to various individual publications identified by a numeric designator contained within a pair of brackets. For example, such a reference may be identified by reciting, "reference [1]" or simply "[1]". Multiple references will be identified by a pair of brackets containing more than one designator, for example, [3, 18, 22, 9]. A listing of the publications corresponding to each designator can be found at the end of the Detailed Description section.

SUMMARY

The present invention is directed toward a system and process for providing a geometric model database for use in a ubiquitous computing environment. In general, the geometric model database system and process is capable of accepting information about the geometric state of the environment, building a geometric model of this environment, maintaining and storing the geometric model, and handling queries about the environment's geometric state.

The task of building a geometric model begins by establishing a set of entities that are of interest in the environment. An entity represents an object which exists in the physical world (e.g., a person, I/O device, or sensor). In the geometric model, an entity is represented by a coordinate frame (or just "frame" for short) and an extent. The frame of an entity has a pre-selected origin somewhere on or within the object. Coordinate axes extend from this origin. In a preferred embodiment of the model, only the orthogonal x and y axes are used and represent the axes that could be "seen" looking down onto the environment. Entity identification information is provided to the geometric model program from external programs. When an entity is first identified, the geometric model program assigns an entity identifier (ID) that uniquely identifies the entity. This information is provided back to the outside program which introduced the entity, and possibly to some other repository of identification information. The entity ID is used by outside programs when updating information about an entity or when making a query about the physical relationships between entities. Entities may be created or deleted and at any time during the period which the model exists.

The location of an entity in the physical world is defined using "measurements". In general, a measurement is simply a mathematical description of the geometric relationship between two entities. More precisely, a measurement describes the position and orientation of one entity's coordinate frame, expressed in terms of another entity's coordinate frame. Measurements originating at an entity's frame are expressed in terms of that frame. In addition, measurements ending at an entity's frame, end at the origin of that frame. While various mathematical representations of the geometric relationship between entities could be employed, a preferred one characterizes a measurement as the relative position, and the relative orientation or heading, of two entities.

A way to envision the foregoing method of representing the locations of the entities is to imagine that the frames of the entities are related by a chain of measurements. Sensors in the environment provide each link in the measurement chain. However, the sensor readings are processed outside the geometric model program and just the relative coordinates are provided as measurements to the model program. As with the entities, a measurement ID is assigned by the geometric model program to each new measurement provided to it. These measurement IDs are issued back to the program providing the measurement (and possibly to some outside database) so that any updates that are provided in the future can be identified as being associated with the previous measurement. Typically, a new measurement is used to replace the existing measurement with that ID.

Measurements in the geometric model preferably also reflect the spatial uncertainty associated with the method used to obtain them. One way of introducing an uncertainty estimate into the measurements is to employ a Gaussian uncertainty model where rather than a measurement being a particular value, it is provided to the geometric model program as a mean estimate for each coordinate and a covariance matrix for each that is indicative of the uncertainty of the coordinate mean. One advantage of characterizing the measurements in the foregoing way is that it can be used to enhance certain optional procedures performed within the geometric model program that are designed to test the accuracy and revise the measurements provided to the program. One class of these methods employs the concept of cycle-based constraints. A cycle is a loop formed by connected entities frames. In the environment these loops represent measurements from a first entity frame (which could be any one in the loop) to the next and so on until a measurement connects the next to last entity frame back to the first entity frame. The significance of a cycle is that the measurements around the loop should return precisely to where they started, i.e. a "zero difference". If they do not then the previously provided uncertainty estimates could be used to adjust the measurements within the loop to obtain the desired zero difference. In this case, measurements are adjusted in proportion to the amount of uncertainty in each one. Specifically, the measurement cycles existing in the geometric model are identified. One of the entities making up each cycle, for which an actual location corresponding the origin of its frame is known, is selected as the first entity of the cycle. The difference between the actual location of the first entity frame's origin and the location of that origin as indicated by following the chain of measurements making up the cycle is then determined. Revised measurements for the identified cycles are computed next by simultaneously adjusting the measurements of all the identified cycles based on their associated uncertainty estimates, so as to make the difference between the actual location of the first entity frame's origin in each of the identified cycles match the location of that origin as indicated by following the chain of measurements making up the cycle.

It is further noted that there may be more than one measurement input from different sources to describe the geometric relationship between the same two entity frames. Each of the measurements would be assigned a different ID and so could co-exist in the same model. Thus there would be a question as to which measurement to use in responding to a query. One way to deal with this situation is to simply chose one of them arbitrarily for use in responding to a query, as was done in tested embodiment of the geometric model program. Another way would be to choose the measurement with the lowest uncertainty estimate. Alternatively, the two measurements could be combined using the relative uncertainties as weights in the combination process [1].

Another accuracy testing procedure that could be implemented based on the aforementioned cycles involves detecting inconsistencies. This would entail following the measurements forming a cycle around from a first entity frame to compute a location of the origin of the first frame, while using the uncertainty estimates associated with each measurement to compute an uncertainty region around the computed origin location. The first entity frame can be any one in the loop for which an actual location corresponding the origin of the frame has been previously specified, and the uncertainly region essentially defines a area around the computed location. If the specified location of the entity frame chosen as the first in the cycle falls within the uncertainty region, then the measurements are considered to be accurate. If, however, the specified location falls outside the aforementioned region, then it can be surmised that at least one of the measurements making up the cycle is incorrect. It would not be known which measurement or measurements in the cycle are incorrect. However, knowing that at least one of them is in error, the geometric model program could be designed to disregard all the measurements that are part of the cycle. Further, the geometric model program could provide feedback to the program or programs that inputted the suspect measurements and request that new measurements be provided. The inconsistency check would then be performed using the updated measurements.

The foregoing accuracy testing procedures can also be combined as follows. First, all the cycles of measurements existing in the geometric model are identified. Then, for each identified cycle, the previously-described process for detecting inconsistencies in the measurements of a cycle is performed. If it is determined that at least one of the measurements making up the cycle is inconsistent, then the measurements are ignored and potentially replaced. However, if the computed location of the first entity frame of the cycle is not exactly the same as the specified location but falls within the aforementioned uncertainty region, then revised measurements for the cycle are computed by simultaneously adjusting the measurements based on their associated uncertainty estimates so as to make the difference in the actual location of the first entity frame's origin in each of the identified cycles match the location of that origin as indicated by following the chain of measurements making up the cycle.

It is also noted that any of the foregoing accuracy testing methods could be repeated each time a new or updated measurement is received. Or, alternately, the methods could be repeated on a periodic basis.

It was mentioned previously that an entity is represented in the geometric model as a coordinate frame and an extent. Real world entities will have some physical size. In addition, a physical object could have some service region, such as a field of view associated with a camera or display device. It is advantageous to augment the geometric model with these region descriptions, which are called extents. Thus, an inputting program would include in its description of an entity any extents associated with the entity. The geometric program would preferably treat each entity-extent combination as separate entities with a measurement of zero between them. Thus, each entity has only one extent, but multiple entities may refer to the same physical device. By default in the preferred embodiment, if no extent is explicitly specified for an entity, a point extent is assumed. This point extent can be defined as being located at the origin of the entity's frame, or at a location having some prescribed geometric relationship to the origin of the entity's frame. It is noted that the description of the area in the environment associated with an extent is expressed in terms of the coordinate frame of the corresponding entity. The extent of an entity can be expressed as having any planar geometric shape. However, in tested embodiments of the geometric model program the area associated with an extent was expressed as a polygon, (including degenerate cases such as a point when no extent is specified or a line segment such as in the case of a flat display screen which appears as a line from above).

The geometric model of the environment is constructed from three components input by outside programs. Namely, entities, extents associated with entities, and measurements between entity frames. However, the environment being modeled will typically change. Thus, it is necessary that the presence of an entity and the measurements between entity frames be updated on an on-going basis to keep the geometric model current. The aforementioned entity and measurement IDs are used in this updating process. In view of the need to keep the geometric model current an assumption is made that some mechanism is in place which causes the outside programs feeding the model program to input changes. As indicated previously, when an entity is created, an entity ID is assigned. Thus, any new entity introduced by an outside program would also be issued a unique entity ID. Whenever, a outside program refers to an entity it does so by using the assigned entity ID. As a consequence, the outside programs must have the capability to retain these IDs. If an outside program indicates that an entity is no longer in the environment, the entity ID is deactivated and preferably not used again to prevent confusion. In a similar way, outside programs that input updated measurements would do so by referring to the appropriate measurement ID. The same measurement ID can be retained for the updated version as the ID refers to the existence of geometric relationship between two entities not a specific instance of that relationship. However, if an entity associated with a measurement is eliminated from the geometric model, all the measurements which refer to that entity should also be deleted, and preferably the measurement ID retired to prevent confusion.

The geometric model database is preferably stored in a readily accessible memory, such as a RAM, while the geometric model program is running so as to facilitate updating the model and processing queries concerning the geographic relationships represented by the model. However, when the program is exited the model may be lost. Of course, the geometric model database could be rebuilt each time the program is executed. However, this requires the outside programs that feed entity, measurement and extent information into the geometric model program to supply this information each time. While a typical ubiquitous computing environment is dynamic in nature, many things do not change that often, such as the location of many I/O devices and sensors. Thus, there is some redundancy in re-building the model each time the geometric model program is executed that could be avoided. One way of avoiding this redundancy would be to store the relatively fixed or static portions of the model in a non-volatile memory and initialize the model using this information each time the geometric model program is executed. It is noted however, that since the entity IDs and measurement IDs associated with the static model data would be retained from one session to the next, any outside program that wishes to provide inputs or make queries would have to have the capability of permanently storing this information, or perhaps more practically, obtaining the IDs from a separate database maintained for that purpose.

In the event that some of the fixed portions of the geometric model change, or new fixed entities, etc., are added to the model, the initializing database could be updated accordingly so as to be as accurate as possible the next time the geometric model program is executed.

The primary purpose of creating and maintaining the geometric model of the ubiquitous computing environment is to respond to queries about the geometric relationships between entities. While a query could be as simple as what extent is associated with a particular entity, typically the requested information will be directed at the relationships between the various entities and/or their extents. There are two fundamental types of queries about these relationships that the geometric model program will be called upon to answer. The first type is a query concerning the relative relationship between two entities. There may be a single measurement already existing between the frames of the entities in question. If so, the answer to the query is straightforward. However, suppose there is no direct measurement between the entities involved in the query. If at least one path of measurements exists between two entity frames, then a single geometric relationship can be derived between them. However, in such a case the geometric relationship must be derived from the multiple measurements making up the path. The first part of this process is to find a measurement path between the two entity frames in question. One way of doing this is to find a path having the fewest number of measurements between the query entities. This can be accomplished using a breadth-first search procedure. It is noted that if two paths have the same number of measurements (i.e., a tie), either could be chosen arbitrarily, or some selection criteria such as the collective uncertainty of the path could be employed to make the choice. The next phase of the response to the first type of query involving the geometric relationship between two entities is to compute a single measurement describing the relationship and output it to the querying program.

The second type of query concerns a request to find an entity or set of entities whose extents have a particular geometric relationship to a given entity. The first phase of this process is to define the relationship between the given entity frame and each of the other entity frames in terms of the given entity's coordinate frame. This is accomplished just as it was in responding to the first type of query, with the exception that it is repeated to find the relationship between the given entity frame and every other entity frame, not just for one other. The next phase in this type of query could generally be characterized as a region intersection problem. Essentially, some region associated with a given entity frame is specified. This region could be a newly defined region, or it might be the aforementioned extent of the entity. A newly defined region could be any desired planar shape, however, for convenience the following description will assume the newly defined region (or one corresponding to an entity's extent) is a polygon as was used in tested embodiments of the geometric model program. The extents associated with all the other entities would be transformed using the computed relationships into the given entity's coordinate frame. The region intersection technique would then be employed to determine if extents associated with the other entities intersect the defined region. Those entities whose extents are discovered to intersect the region would be reported to the program making the query.

When the purpose for a query is to determine if one entity is in the field of view of another, such as where the querying program wants to display something intended for the person to see, the aforementioned rotational coordinates used to indicate the "heading" of an entity could be used in answering the query. For instance, if the rotation component associated with the person indicates that the display screen would be in his or her field of view, then this would be reported. If not, then it could be reported to the querying program that the person could not see the display screen. The same procedure could be performed in the context of the display screen to ensure that it is oriented such that the person can see it.

It is noted that a query could be of a one-time or "one-shot" nature, or may be a standing query. For a one-time query, the querying program would request the desired geometric information and receive a one-time response. However, a standing query would be one predicated on some event, and every time this event occurred, a response to the query would be provided. For example, the previously discussed query concerning whether a person could clearly see a display screen might be requested to be responded to every time the person of interest is added to the geometric model of the environment (e.g., enters a room). It is also noted that because the environment is dynamic, the response to such a query may have to be re-computed each time it is responded to, rather than relying on the previous response.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

Figure 1:
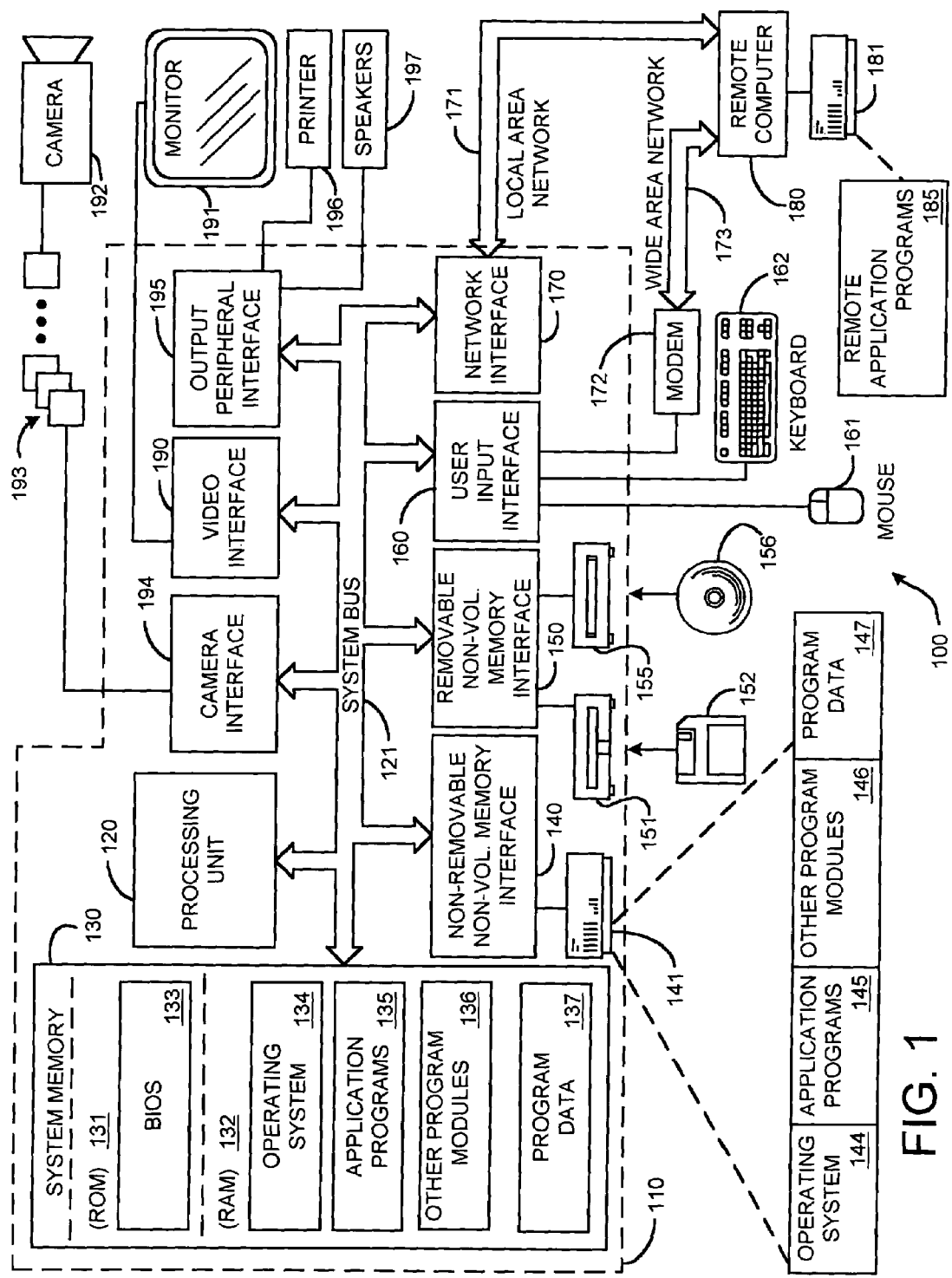
FIG. 1 is a diagram depicting a general purpose computing device constituting an exemplary system for implementing the present invention.

Before providing a description of the preferred embodiments of the present invention, a brief, general description of a suitable computing environment in which the invention may be implemented will be described. FIG. 1 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as input devices to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
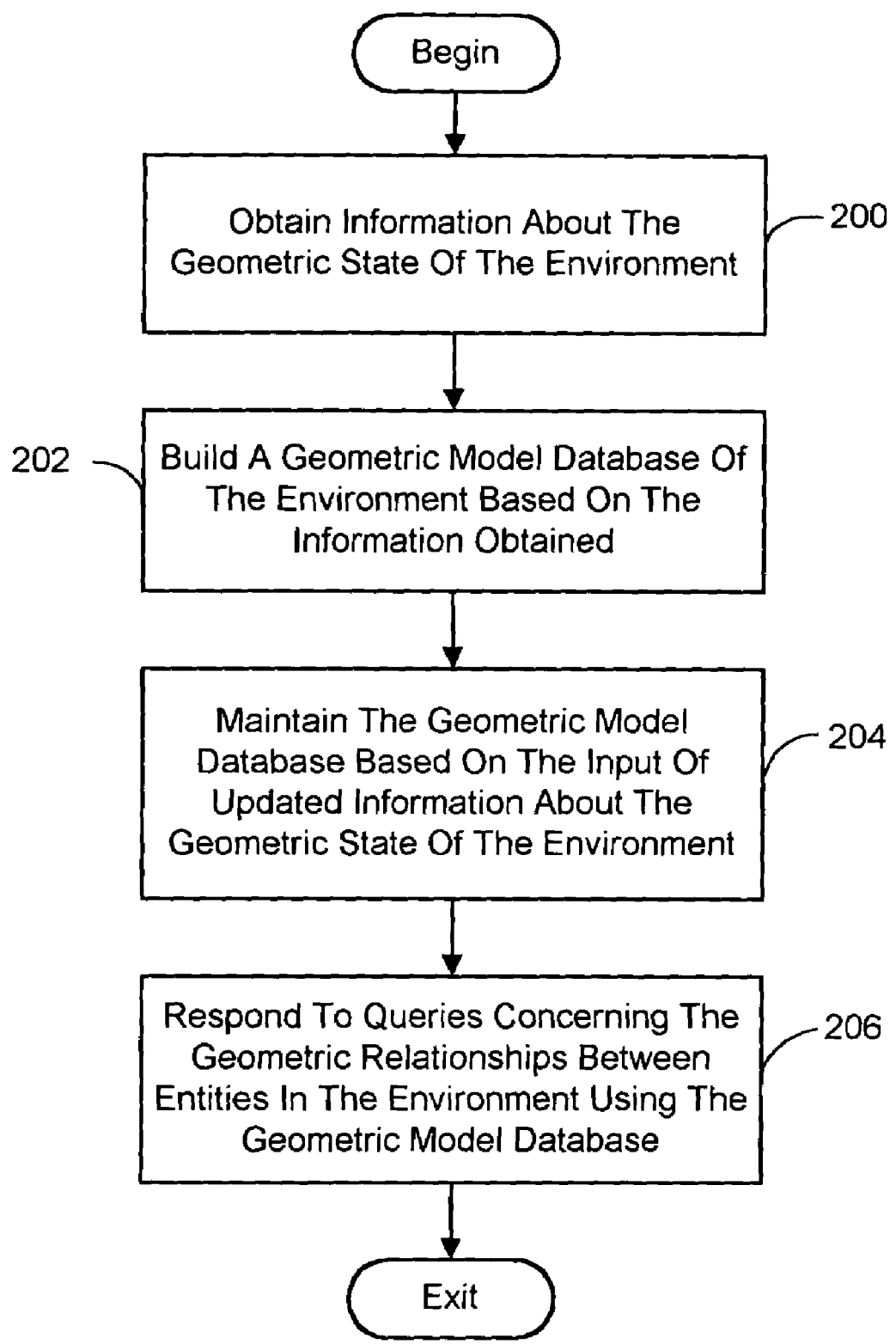
FIG. 2 is a flow chart diagramming an overall process for providing a geometric model database for use in a ubiquitous computing environment to respond to queries about the environment's geometric state in accordance with the present invention.

The exemplary operating environment having now been discussed, the remaining part of this description will be devoted to a discussion of the program modules embodying the aforementioned system and process for providing a geometric model database for use in an ubiquitous computing environment. In general, the geometric model program is accomplished via the following process actions, as shown in the high-level flow diagram of FIG. 2. First, in process action 200, information about the geometric state of the environment is obtained. As will be described in more detail later, this action preferably involves outside programs providing identifying information concerning objects or persons (referred to hereinafter as entities), which are to be included in the geometric model database. In addition, the outside programs would specify the extent of the identified entity and provide measurement information associated with the location of the entity. Both the extent and measurement concepts will be fully described in the sections that follow. A geometric model database of the environment is built based on the information obtained (process action 202), and then queries concerning the geometric relationships between entities in the environment are responded to using the geometric model database (process action 206). In addition, the geometric model database can be maintained by periodically modifying it based on the input of updated information about the geometric state of the environment (process action 204). This updated database is then used to respond to the aforementioned queries. Each of these tasks will be described in detail in the sections that follow.

1.0 Building a Geometric Model of the Environment

Figure 3:
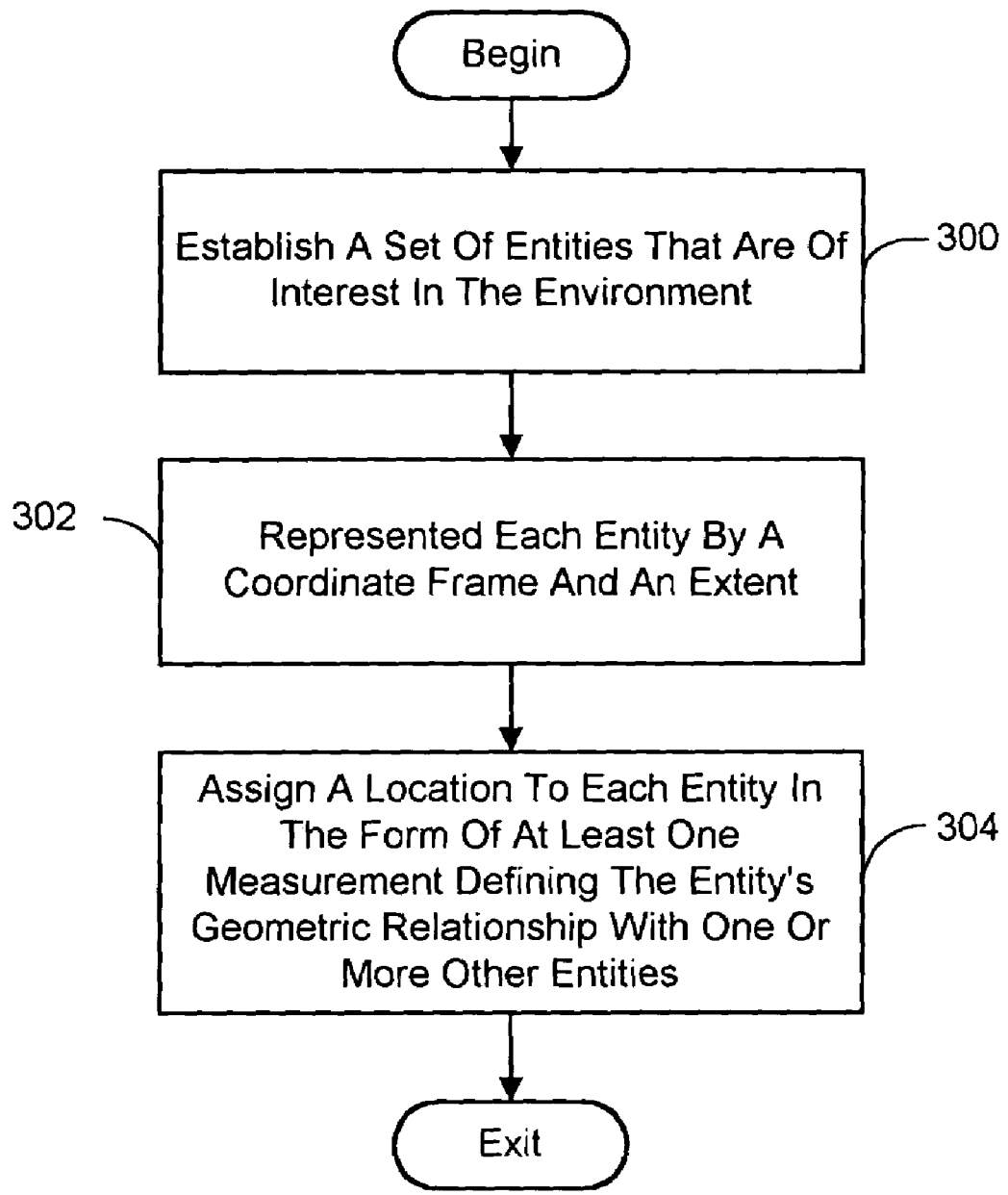
FIG. 3 is a flow chart diagramming a process for building the geometric model database, in accordance with the model building module of the overall process of FIG. 2.

Referring to FIG. 3, the task of building a geometric model begins by establishing a set of entities that are of interest in the environment (process action 300). An entity represents an object which exists in the physical world (e.g., a person, I/O device, or sensor). In addition, a single physical object may have different components (e.g., a laptop computer with both screen and keyboard sections) that could be included in the geometric model as separate entities. An entity is represented in the geometric model by a coordinate frame (or just "frame" for short) having a pre-selected origin contained on or within the entity, and an extent (process action 302). In a preferred embodiment of the model, only the orthogonal x and y axes are used and represent the axes that could be "seen" looking down onto the environment. For example, the origin of the frame of a display screen might be define as being in the middle of the screen as viewed from above, with one axis parallel to the screen and one axis perpendicular to the screen. Another example would be a person. A person could be represented in the model by a frame origin coinciding with their center of mass and having one axis pointing in a positive direction to the person's right and the other axis pointing in a positive direction straight ahead of the person. Entity identification information is provided to the geometric model program from "outside" programs. When an entity is first identified, the geometric model program assigns an entity ID that uniquely identifies the entity. This information is provided back to the outside program which introduced the entity, and possibly to some other repository of identification information. The entity ID is used by outside programs when updating information about an entity or when making a query about the physical relationships between entities.

The location of an entity in the physical world is defined using "measurements". In general, a measurement is simply a mathematical description of the geometric relationship between two entities. While various mathematical representations of the geometric relationship between entities could be employed, a preferred one characterizes a measurement as the relative position, and the relative orientation or heading, of two entities. More precisely, a measurement describes the position and orientation of one entity's coordinate frame, expressed in terms of another entity's coordinate frame. Measurements originating at an entity's frame are expressed in terms of that frame. In addition, measurements ending at an entity's frame, end at the origin of that frame. Any program providing a measurement relating two entities is assumed to know the origin of the coordinate frame of the entities. For example, any program providing measurements which relate the frame of the display screen described above to another frame must be sure that the sensor being used does, in fact, make it's measurements relative to center of the screen, or the program must internally transform the measurement so that this is true. Thus, referring to FIG. 3 once again, the next process action 304 performed in building a geometric model is to assign at least one measurement defining the entity's geometric relationship with one or more other entities. This effectively describes it's location. Multiple measurements associated with a single entity would occur where separate measurements are supplied between the entity and more than one other entity.

Figure 4:
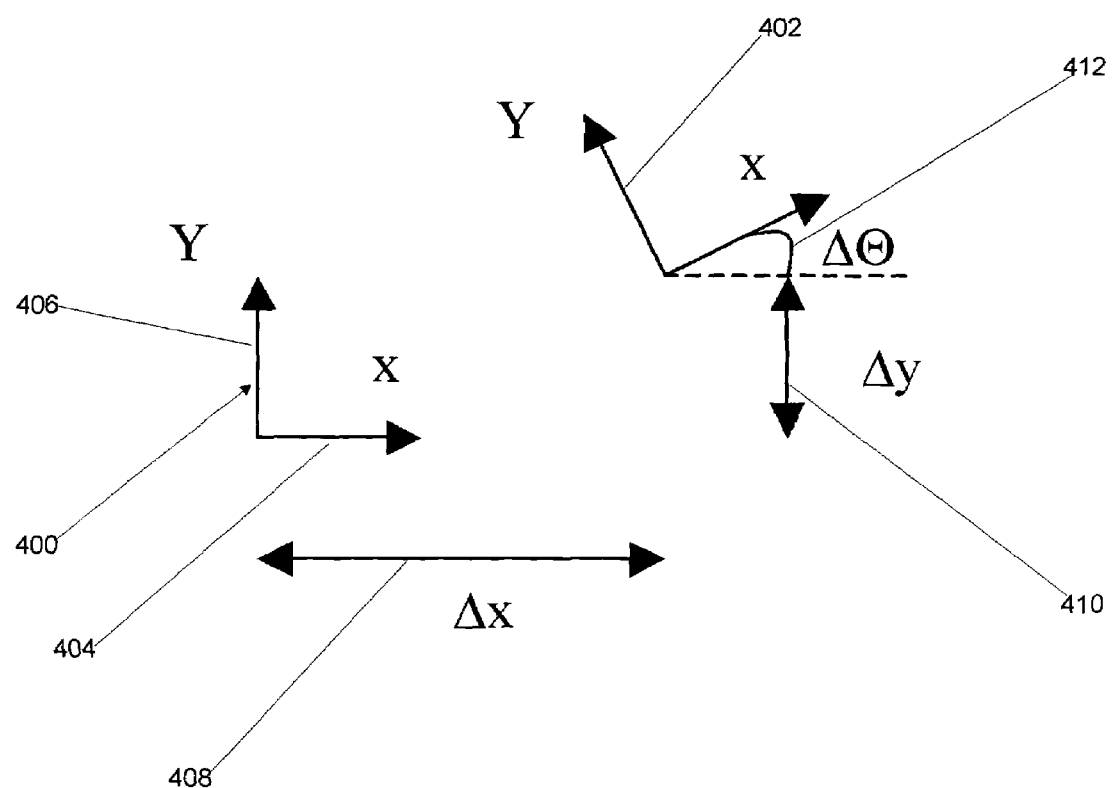
FIG. 4 is a diagram illustrating a preferred measurement scheme employed in the present invention to describe the location of an entity in the environment, where each measurement describes the position and orientation of one entity's coordinate frame, expressed in terms of another entity's coordinate frame.

An example of the foregoing measurement scheme is illustrated in FIG. 4. The location of an entity (hereinafter referred to as the destination entity as the measurement ends at the entity), whose frame 402 is shown in the upper right hand corner, in relation to an originating entity (so called as the measurement originates from that entity), whose frame 400 is shown in the lower left hand corner, could be defined by a set of x,y coordinates 404, 406 as viewed from the coordinate frame 400 associated with the originating entity. Specifically, as shown in FIG. 4, the measurement between the frames 400 and 402 of the two entities would include a $\alpha x$ coordinate 408 associated with the distance between the origins of the two frames along the x-axis 404 of the originating entity's frame 400, and a $\Delta y$ coordinate 410 associated with the distance between the origins of the two frames along the y-axis 406 of the originating entity's frame 400. The measurement between the frames 400 and 402 of the two entities would also include a $\Delta\theta$ coordinate 412 associated with the degree of rotation of the destination entity's frame 402 in relation to the originating entity's frame 400. This rotational component is a measure of the relative rotation of the destination entity's frame 402 relative to the originating entity's frame 400 about the axis defined by the positive cross product of the x and y axes 404, 406, assuming a right-handed coordinate system. The rotational component can be quite useful for entities such as a display screen or a person as it can be used to determine which way the entity is facing. For example, if a display screen is directed away from where a person is facing, the person would not be able to see the screen. Thus just knowing the relative positions of the screen and the person would not be enough to determine if the person could see the screen. Furthermore, there is no a priori reason to expect that all entities have coordinate frames with their X and Y axes aligned. Thus, a rotational component is needed.

A way to envision the foregoing method of representing the locations of the entities is to imagine that the frames of the entities are related by a chain of measurements. Sensors in the environment provide each link in the measurement graph. However, the raw sensor readings are processed outside the geometric model program and just the relative coordinates are provided as measurements to the model program (along with uncertainty estimates as discussed below). As with the entities, a measurement ID is assigned by the geometric model program to each new measurement provided to it. These measurement IDs are issued back to the program providing the measurement (and possibly to some outside database) so that any updates that are provided in the future can be identified as being associated with the previous measurement. Typically, a new measurement is used to replace the existing measurement with that ID. The foregoing chain of measurements model is illustrated in graph of FIG. 5. The lettered vertices 500 in FIG. 5 respectively represent the origin of each entity frame, and the lines 502 connecting the vertices represent the existence of a measurement of the geometric relationship between the connected entities' frames. It is noted that the lines 502 do not imply that the measurements were taken from (i.e., observed by one of) either of the physical embodiments of either of the pair of connected entities. Rather, they simply represent a relative measurement between the frames of two entities, and may have been derived from a sensor at another location in the environment. It is also noted that the measurements are invertible between two entity frames in the graph. Thus, a measurement in the graph can represent not only the relative position between entity A's frame and entity B's frame, but also between entity B's frame and entity A's frame.

It is noted that there is a possibility that more than one measurement would be input from different sources to describe the geometric relationship between the same two entity frames. Each of the measurements would be assigned a different ID and so could co-exist in the same model. Thus there would be a question as to which measurement to use in responding to a query. One way to deal with this situation is to simply chose one of them arbitrarily for use in responding to a query, as was done in tested embodiment of the geometric model program. Alternately, as will be discussed next, the measurement having the lowest uncertainty estimate could be chosen and the others ignored. Alternatively, the two measurements could be combined using the relative uncertainties as weights in the combination process [1].

Measurements in the geometric model preferably reflect the spatial uncertainty associated with the method used to obtain them. For example, a measurement taken directly by a user might be considered more certain than the same measurement derived from images of the scene. One way of introducing an uncertainty estimate into the measurements is to employ a Gaussian uncertainty model where rather than a measurement being a particular value, it is provided to the geometric model program as a mean estimate for each coordinate and a covariance matrix for each that is indicative of the uncertainty of the coordinate mean [1]. The advantage of characterizing the measurements in the foregoing way is that it can be used to enhance certain optional procedures performed within the geometric model program that are designed to test the accuracy and possibly even revise the measurements provided to the program.

Figure 5:
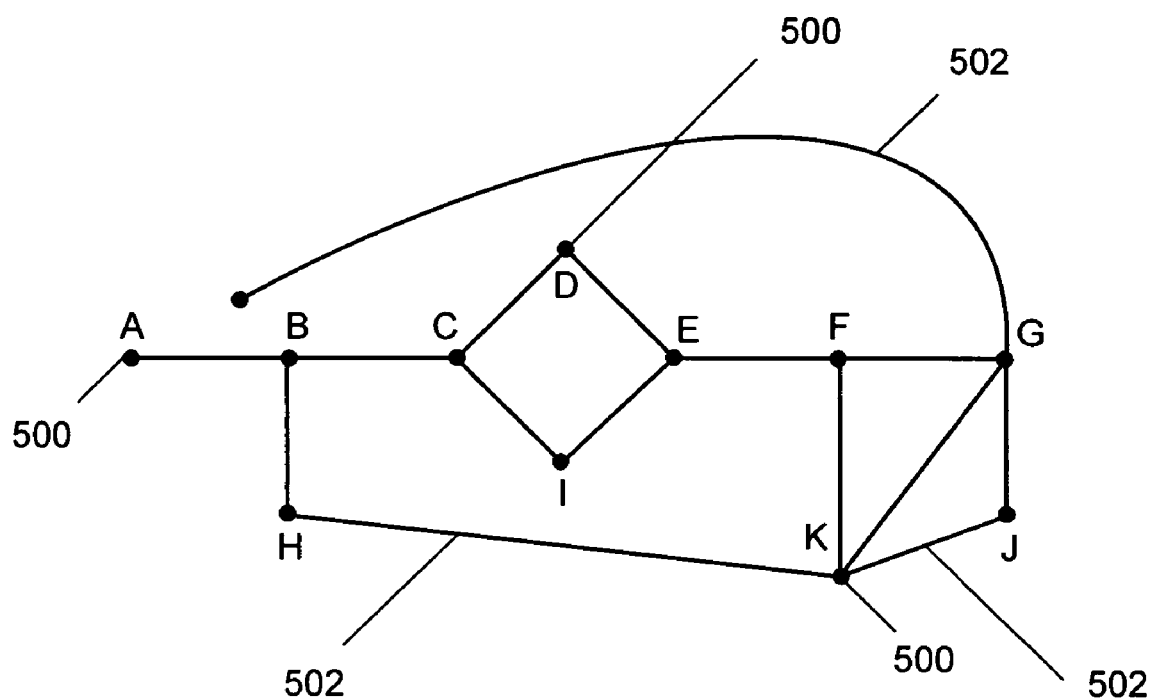
FIG. 5 is a diagram illustrating an example of a chain of measurements linking a series of entities.

One class of error detection methods employs the concept of cycle-based constraints. Cycles can be best envisioned in reference FIG. 5. A cycle is a loop formed by connected entities frames. In FIG. 5, there are many such loops including CDEI, FGJK, FGK, GJK, BCDEFKH, and BCIEFKH, among others. In the environment these loops represent measurements from the origin of a first entity frame (which could be any one in the loop) to the next and so on until a measurement connects the next to last entity frame back to the origin of the first entity frame. The significance of a cycle is that the measurements around the loop should return precisely to where they started, i.e. a "zero difference". If they do not then the previously provided uncertainty estimates could be used to adjust the measurements within the loop to obtain the desired zero difference. A conventional method for accomplishing this adjustment procedure is described in reference [2]. It is noted that this adjustment process could be repeated each time a new, updated measurement associated with a loop is received. Or alternately, the adjustment process could be repeated on a periodic basis to test the accuracy and revise the measurements in light of any new measurements that have been received. Further, it is noted that the adjustment procedure of reference [2] would produce only small changes, if any, for measurements with a high degree of certainty (such as those that where physically measured), whereas larger changes could be expected for those measurements having a low certainty.

Figure 6:
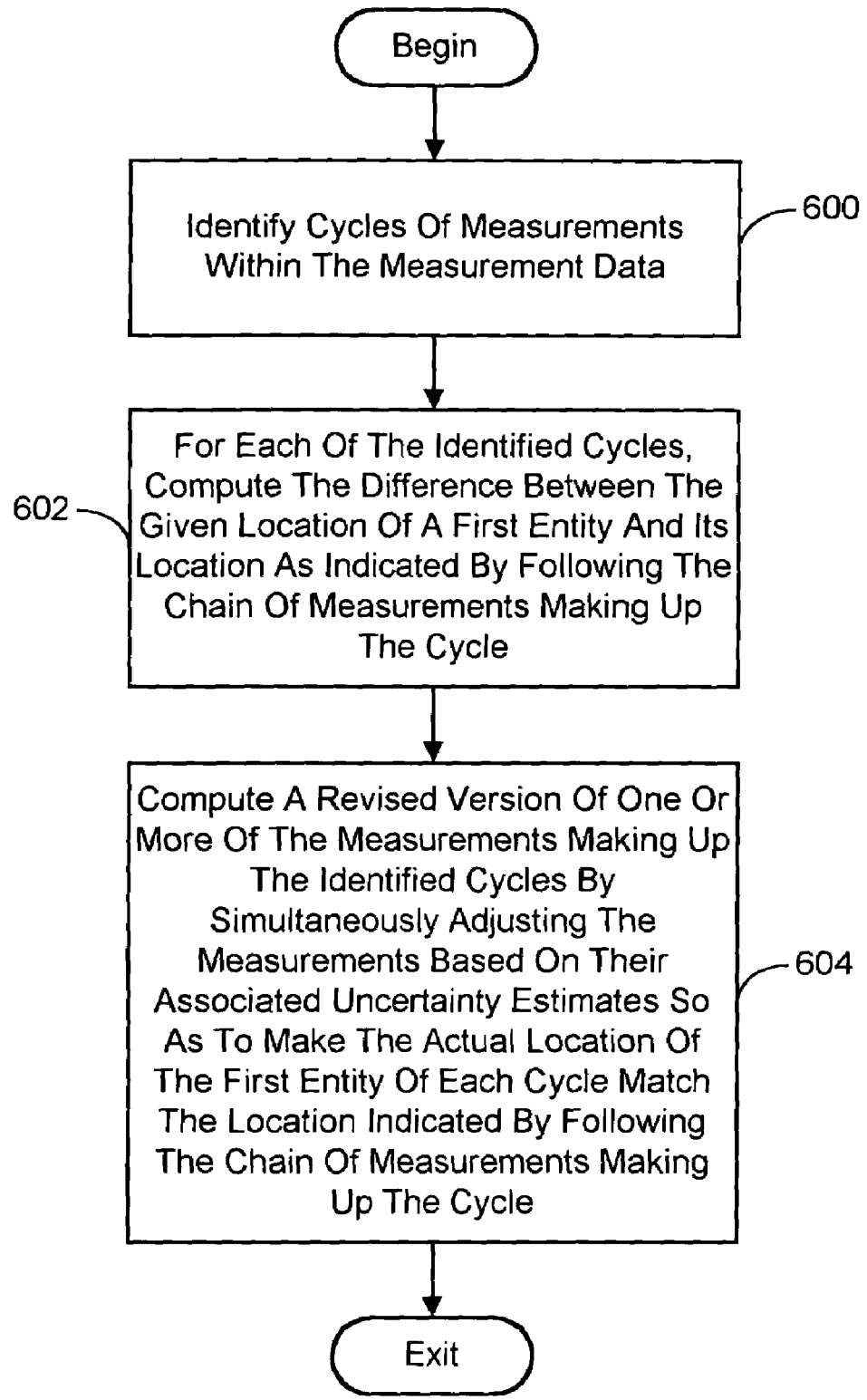
FIG. 6 is a flow chart diagramming a first error detection process for identifying and revising measurements that can be used in conjunction with the model building module of the overall process of FIG. 2.

Thus, referring to FIG. 6, the foregoing version of an error detection process, which could optionally be employed with the present geometric modeling program, would generally involve first identifying cycles of measurements within the measurement data (process action 600). Next, for each of the identified cycles, a difference is computed between a given location of an arbitrarily chosen first entity, as originally provided to the geometric modeling database, and the location of the chosen first entity's frame, as indicated by following the chain of measurements around the cycle (process action 602). Revised versions of one or more of the measurements making up the identified cycles are computed by simultaneously adjusting the measurements based on the previously-described uncertainty estimates associated with the measurements so as to make the location of the chosen first entity of each of the identified cycles as indicated by following the chain of measurements around the cycles to match the given location of those entities (process action 604). The reason for adjusting all the measurements of the identified cycles simultaneously is that a particular measurement may be part of more than one cycle. Simultaneously adjusting all the measurements ensures a "zero difference" is created for all the cycles, even those with shared measurements.

Figure 7:
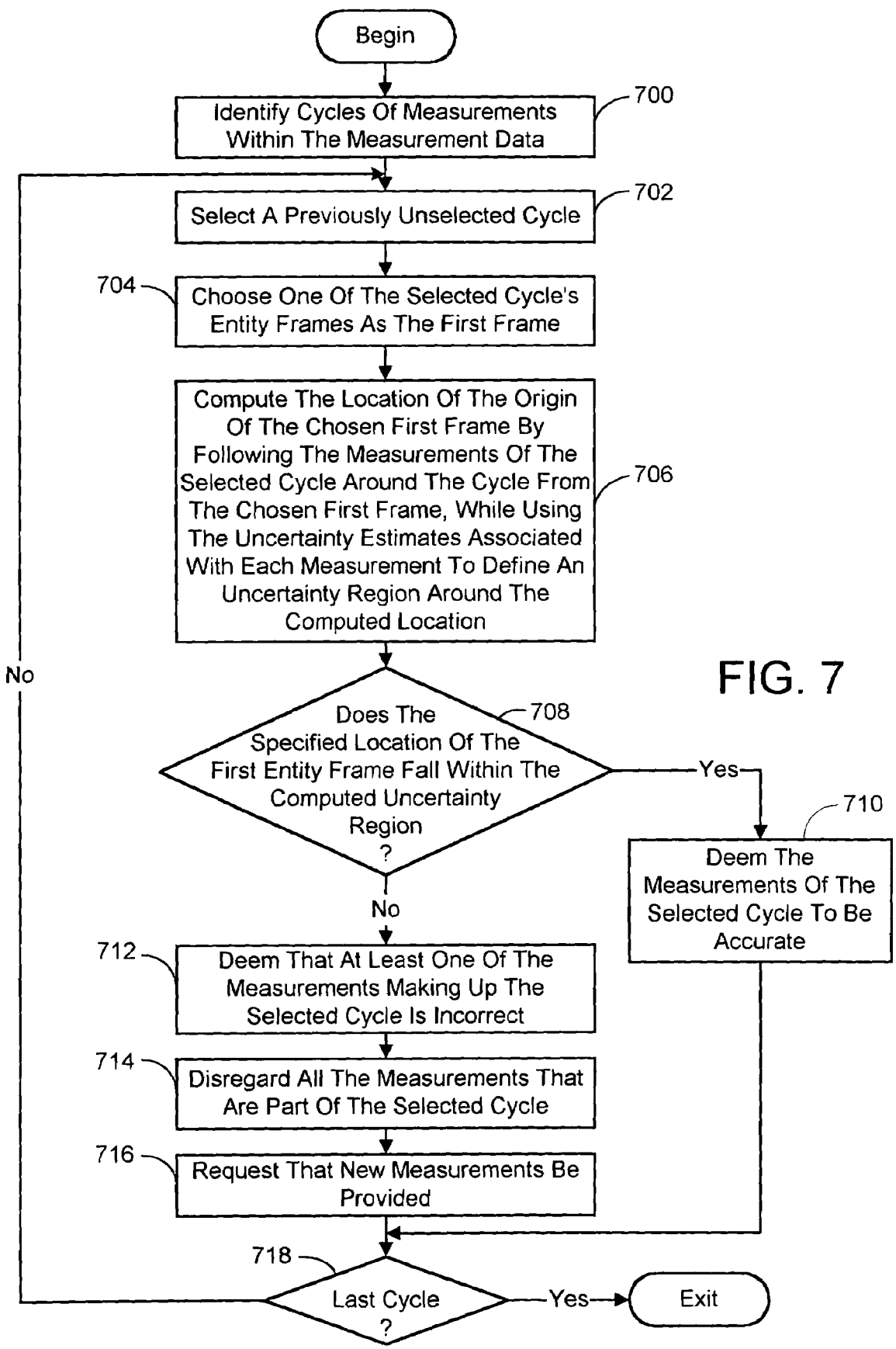
FIG. 7 is a flow chart diagramming a second error detection process for identifying and handling errors in measurements that can be used in conjunction with the model building module of the overall process of FIG. 2.

Another error detection procedure that could be implemented based on the aforementioned cycles involves detecting inconsistencies in the measurements. Referring to FIG. 7, the first process action 700 of this alternate error detection procedure entails identifying cycles of measurements within the measurement data. Next, one of the identified cycles is selected (process action 702), and choosing one of the cycle's entity frames as the first frame (process action 704). The first entity frame can be any one in the loop for which an actual location corresponding the origin of the frame has been previously specified. The measurements forming a selected cycle are then followed around the cycle from the chosen first entity frame to compute the location of the origin of the selected entity frame, while using the uncertainty estimates associated with each measurement to define an uncertainty region around the computed origin location (process action 706). The uncertainly region essentially defines an area around the computed location. It is then determined if the specified location of the entity frame chosen as the first in the cycle falls within the computed uncertainty region, as indicated by process action 708. If so, then the measurements are considered to be accurate (process action 710). If, however, the specified location falls outside the uncertainty region, then it is deemed that at least one of the measurements making up the cycle is incorrect (process action 712). It would not be known which measurement or measurements in the cycle are incorrect. However, knowing that at least one of them is in error, the geometric model program could be designed to disregard all the measurements that are part of the cycle (process action 714). Further, the geometric model program could provide feedback to the program or programs that inputted the suspect measurements and request that new measurements be provided (process action 716). In either case, the error detection procedure is repeated for each remaining cycle (process action 718).

It is noted that the error detection procedures outlined in FIGS. 6 and 7 could be combined as well. In this combined embodiment, the procedure would follow the actions outlined in FIG. 6. If it is determined that at least one of the measurements making up a cycle under consideration is inconsistent, then the measurements are ignored and potentially replaced. However, if the computed location of the first entity frame of the cycle is not exactly the same as the specified location but falls within the aforementioned uncertainty region, then revised versions of the measurements making up the identified cycles would be computed.

Finally, the foregoing error detection procedures (FIG. 6 or FIG. 7 or the combined version) could be performed anytime a new measurement is provided to the geometric model database. Thus, for example, in the case of the procedure outlined in FIG. 7 where new measurements are requested when an error is found, the procedure would be performed again when the new measurements are received. Or, as mentioned previously, these procedures could be repeated on a periodic basis.

It was mentioned previously that an entity is represented in the geometric model as a coordinate frame and an extent. The extent of an entity will now be described. Real world entities will have some physical size. In addition, a physical object could have some service region, such as a field of view associated with a camera or display device. It is advantageous to augment the geometric model with these region descriptions, which are called extents. Thus, an inputting program would include in its description of an entity any extents associated with the entity. The geometric program would preferably treat each entity-extent combination which is related to the same physical item as separate entities with a measurement of zero between them. Thus, each entity has only one extent, but multiple entities may represent the same physical device in the model. By default in the preferred embodiment, if no extent is explicitly specified for an entity, a point extent is assumed. This point extent can be defined as being located at the origin of the entity's frame, or at a location having some prescribed geometric relationship to the origin of the entity's frame. It is noted that the description of the area in the environment associated with an extent is expressed in terms of the coordinate frame of the corresponding entity. The significance of this entity-extent approach will become apparent in the upcoming discussion of querying the geometric model program about geometric relationship in the environment. The extent of an entity can be expressed as having any planar geometric shape. However, in tested embodiments of the geometric model program the area associated with an extent was expressed as a polygon, (including degenerate cases such as a point when no extent is specified or a line segment such as in the case of a flat display screen which appears as a line from above).

2.0 Maintaining the Geometric Model

As described previously, the geometric model of the environment is constructed from three components input by outside programs. Namely, entities, extents associated with entities and measurements between entity frames. However, the environment being modeled will typically change. For example, a new person could enter a room in the environment or someone could leave. Similarly, a new piece of I/O equipment could be added, or an old one replaced. Thus, entities will come and go, and the geometric model must be updated as to the current entities existing in the environment, as well as to their current extents. In addition, entities can be expected to move about in the environment. For example, a person will typically move about a room. In addition, equipment can be relocated. Thus, it is necessary that the measurements between entity frames also be updated on an on-going basis to keep the geometric model current. The aforementioned entity and measurement IDs are used in this updating process. In view of the need to keep the geometric model current an assumption is made that some mechanism is in place which causes the outside programs feeding the model program to input changes. As indicated previously, when an entity is created, an entity ID is assigned. Thus, any new entity introduced by an outside program would also be issued a unique entity ID. Whenever, a outside program refers to an entity it does so by using the assigned entity ID. As a consequence, the outside programs must have the capability to retain these IDs. If an outside program indicates that an entity is no longer in the environment, the entity ID is deactivated and preferably not used again to prevent confusion. In a similar way, outside programs that input updated measurements would do so by referring to the appropriate measurement ID. The same measurement ID can be retained for the updated version as the ID refers to the existence of geometric relationship between two entities not a specific instance of that relationship. However, if an entity associated with a measurement is eliminated from the geometric model, all the measurements corresponding to that entity should also be deleted, and preferably the measurement ID retired to prevent confusion.

3.0 Storing the Geometric Model

The geometric model database is preferably stored in a readily accessible memory, such as a RAM, while the geometric model program is running so as to facilitate updating the model and processing queries concerning the geographic relationships represented by the model. However, when the program is exited the model may be lost. Of course, the geometric model database could be rebuilt each time the program is executed. However, this requires the outside programs that feed entity, measurement and extent information into the geometric model program to supply this information each time. While a typical ubiquitous computing environment is dynamic in nature, many things do not change that often, such as the location of many I/O devices and sensors. Thus, there is some redundancy in re-building the model each time the geometric model program is executed that could be avoided. One way of avoiding this redundancy would be to store the relatively fixed or static portions of the model in a non-volatile memory and initialize the model using this information each time the geometric model program is executed. It is noted however, that since the entity IDs and measurement IDs associated with the static model data would be retained from one session to the next, any outside program that wishes to provide inputs or make queries would have to have the capability of permanently storing this information, or perhaps more practically, obtaining the IDs from a separate database maintained for that purpose.

In the event that some of the fixed portions of the geometric model change, or new fixed entities, etc., are added to the model, the initializing database could be updated accordingly so as to be as complete as possible the next time the geometric model program is executed.

4.0 Handling Queries Concerning the Relationships Between Entities.

The primary purpose of creating and maintaining the geometric model of the ubiquitous computing environment is to respond to queries about the geometric relationships between entities. While a query could be as simple as what extent is associated with a particular entity, typically the requested information will be directed at the relationships between the various entities and/or their extents.

There are two fundamental types of queries about these relationships that the geometric model program will be called upon to answer. The first type is a query concerning the relative relationship between two entities. For example, the query may be a request to specify where entity B (e.g., a display screen) is in relation to entity A (e.g., a person). There may be a single measurement already existing between the frames of the entities in question. If so the answer to the query is straight forward. However, suppose there is no direct measurement between the between entities involved in the query. If at least one path of measurements exists between two entity frames, then a single geometric relationship can be derived between them. However, in such a case the geometric relationship must be derived from the multiple measurements making up the path. The first part of this process is to find the measurement path between the two entity frames in question. One way of doing this is to find a path having the fewest number of measurements between the query entities. This can be accomplished using a breadth-first search procedure. Essentially, a breadth-first search entails starting at the primary entity frame in the query (such as the frame associated with entity A in the example above) and identifying all the entity frames that have measurements between themselves and primary entity frame. The process continues by choosing each of the identified entity frames in turn and then finding and keeping track of all the entity frames having measurements between themselves and the identified entity frame. This stepwise process continues until one of the identified entity frames is associated with the other entity specified in the query. The path of measurements back to the primary entity frame is then identified. For example, referring to FIG. 5, suppose a query asked where entity L was in relation to entity J. First the entity frames connected to J would be identified, i.e., entity frame K and entity frame G in this case. Next the entity frames connected to the newly identified entity frames would be found. In this case, entity frame K is connected to entity frames F, G and H, while entity frame G is connected to entity frames F, K and L. Since entity frame L has been identified the search is over and the measurement path JGL is identified. This should be the path having the smallest number of measurements. It is noted that if two paths have the same number of measurements (i.e., a tie), either could be chosen arbitrarily, or some selection criteria such as the collective uncertainty of the path could be employed to make the choice. The next phase of the response to the first type of query involving the geometric relationship between two entities is to compute a single measurement describing the relationship and output it to the querying program. As mentioned previously, if there is a single measurement existing between the frames of the query entities, it can be used directly to respond to the query. However, when a path having multiple measurements is identified between the frames of the query entities, the measurements must be combined or "fused" to yield a response. Any conventional method of accomplish this fusion can be employed, such as for example the process described in reference [1].

Figure 8:
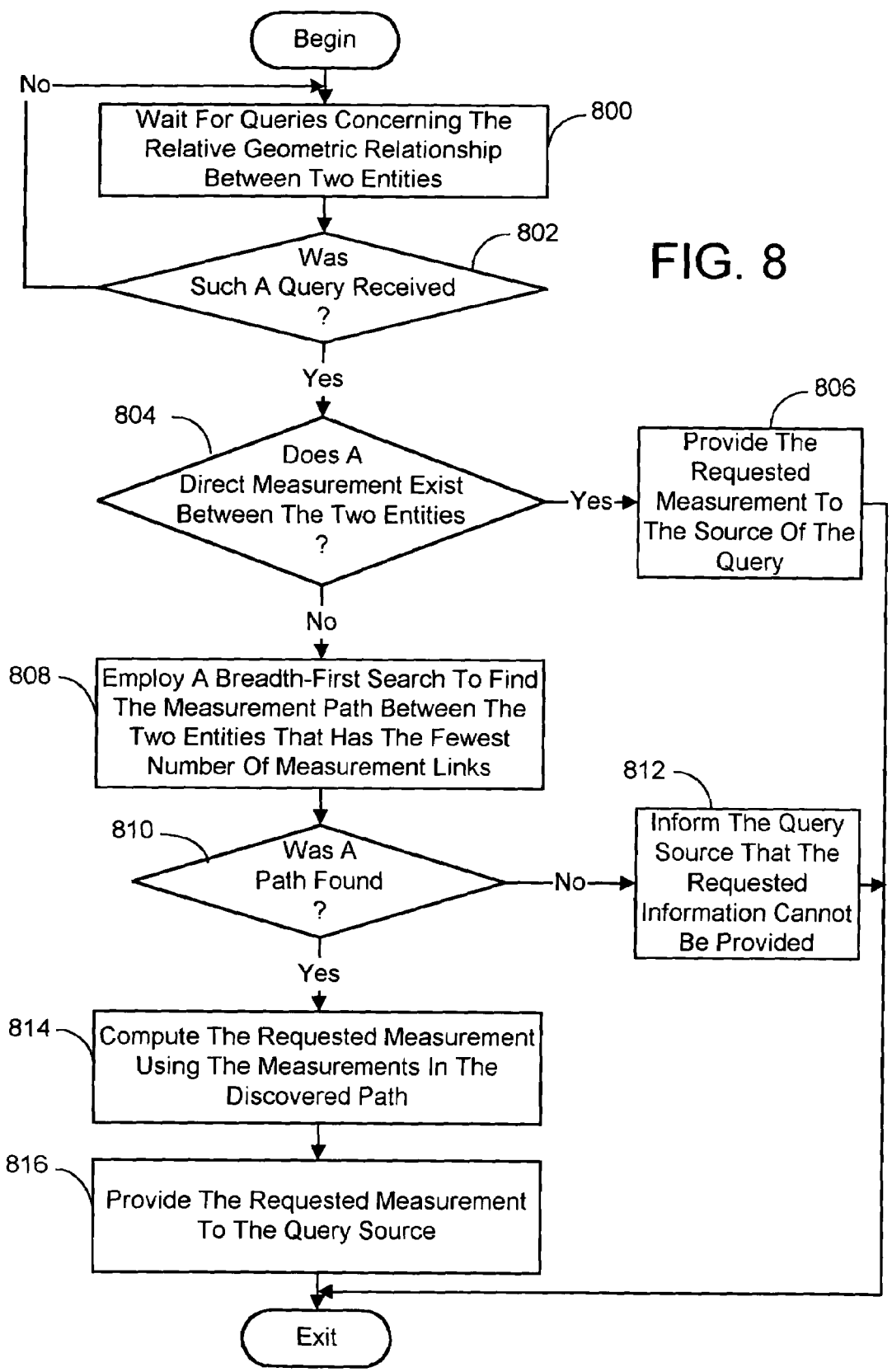
FIG. 8 is a flow chart diagramming a process for responding to queries concerning the geometric relationship between two entities modeled in the geometric model database, in accordance with the response module of the overall process of FIG. 2.

The foregoing process for handling queries concerning the relative geometric relationship between two entities of the database is summarized in the flow diagram of FIG. 8. The first action 800 of the process involves waiting for queries concerning the relative geometric relationship between two entities. Periodically, it is determined whether such a query was received as indicated in process action 802. If no query was received, the waiting and checking actions 800 and 802 are continued. If, however, such a query was received, then it is ascertained whether or not a direct measurement exist in the database between the two entities that are the subject of the query (process action 804). If so, then the requested measurement is provided to the source of the query (process action 806). Whenever there is no direct measurement available, a breadth-first search is employed to find a measurement path between the two entities involved in the query that has the fewest number of measurement links (process action 808). It is next determined in process action 810 whether a path was found at all. If no path was found, then the source of the query is informed that the requested information cannot be provided (process action 812). However, if a path was found, then the requested measurement is computed using the measurements in the discovered path (process action 814), and the requested measurement is provided to the source of the query (process action 816). The monitoring is continued and foregoing procedure repeated every time a new query concerning the relative geometric relationship between two entities is received.

The second type of query concerns a request to find an entity or set of entities whose extents have a particular geometric relationship to a given entity. The first phase of this process is to define the relationship between the given entity frame and each of the other entity frames in terms of the given entity's coordinate frame. This is accomplished just as it was in responding to the first type of query, with the exception that it is repeated to find the relationship between the given entity frame and every other entity frame, not just for one other. There may be cases where the relative geometric relationship between the frame of the given entity and the frame of one of the other entities involved in the query could not be determined due to a lack of the measurement path needed to compute the relationship. This circumstance is noted and reported to the query source in the manner described below.

The next phase in this type of query could generally be characterized as a region intersection problem. Essentially, some region associated with a given entity frame is specified. This region could be a newly defined region, or it might be the aforementioned extent of the entity associated with the frame. A newly defined region could be any desired planar shape, however, for convenience the following description will assume the newly defined region (or one corresponding to an entity's extent) is a polygon as was used in tested embodiments of the geometric model program. As an example of where a newly defined region comes into play, suppose a query asks for all the entities which have extents within some prescribed distance of a given entity. The geometric relationships between the given entity and all others in the environment are computed, as described above. Then, a polygonal region surrounding the given entity would be defined based on the prescribed distance and in terms of the given entity's coordinate frame. The extents associated with all the other entities would also be transformed using the computed relationships into the given entity's coordinate frame. A standard polygon intersection technique (or similar procedure if the region is characterized by a planar shape other than a polygon) would then be employed to determine if extents associated with the other entities intersect the defined region. Those entities whose extents are discovered to intersect the region would be reported to the program making the query.

An example of a query where the extent of a given entity is involved would be as follows. Suppose a query asked what entities are at least partially in the field of view of a camera, where the camera is an entity in the geometric model and the field of view is its extent. First, the respective geometric relationships between the entity frame representing the camera and the frames of all the other entities in the model are computed in terms of the camera-entity's coordinate frame. The extents defining the other entities are then transformed into the camera-entity's coordinate frame. A standard polygon intersection technique (or similar procedure if the extents are characterized by a planar shape other than a polygon) would then be employed to determine if any portion of the other entities' extents overlap the extent of the camera-entity representing its field of view. Those entities having extents that are discovered to overlap would be reported as being within the camera's field of view to the program making the query.

As a further example, consider a query that requests if a person can clearly see a display screen. One way to handle this query would be to define a triangular region in terms of the person-entity's coordinate frame that has one vertex corresponding to a point midway between the person's eyes and its other two vertices corresponding to points at opposite sides of the display screen. This could be done by first querying for the geometric relationship between the person and the display, and utilizing information about the size of the display to determine where the edges should be located. The process would proceed as described above by computing the relationships between the frames of each entity in the environment and the frame of the person-entity. The extents which define the other entities' are transformed using these computed relationships into the person-entity's coordinate frame. A polygon intersection technique (or similar procedure if the defined region and extents are characterized by a planar shape other than a polygon) would then be used to determine if any portion of the other entities' extents overlap the newly defined region. The entities which intersect the original triangular region would be reported back to the querying program Since extents in the model may represent non-physical things such as regions of service (which would not obscure view of a screen), it could be left up to the querying program to determine which of the intersecting extents actually represent things which obscure vision. For example, an entity which represents a field of view of a camera would not obscure a person's sight of a display.

Figure 9:
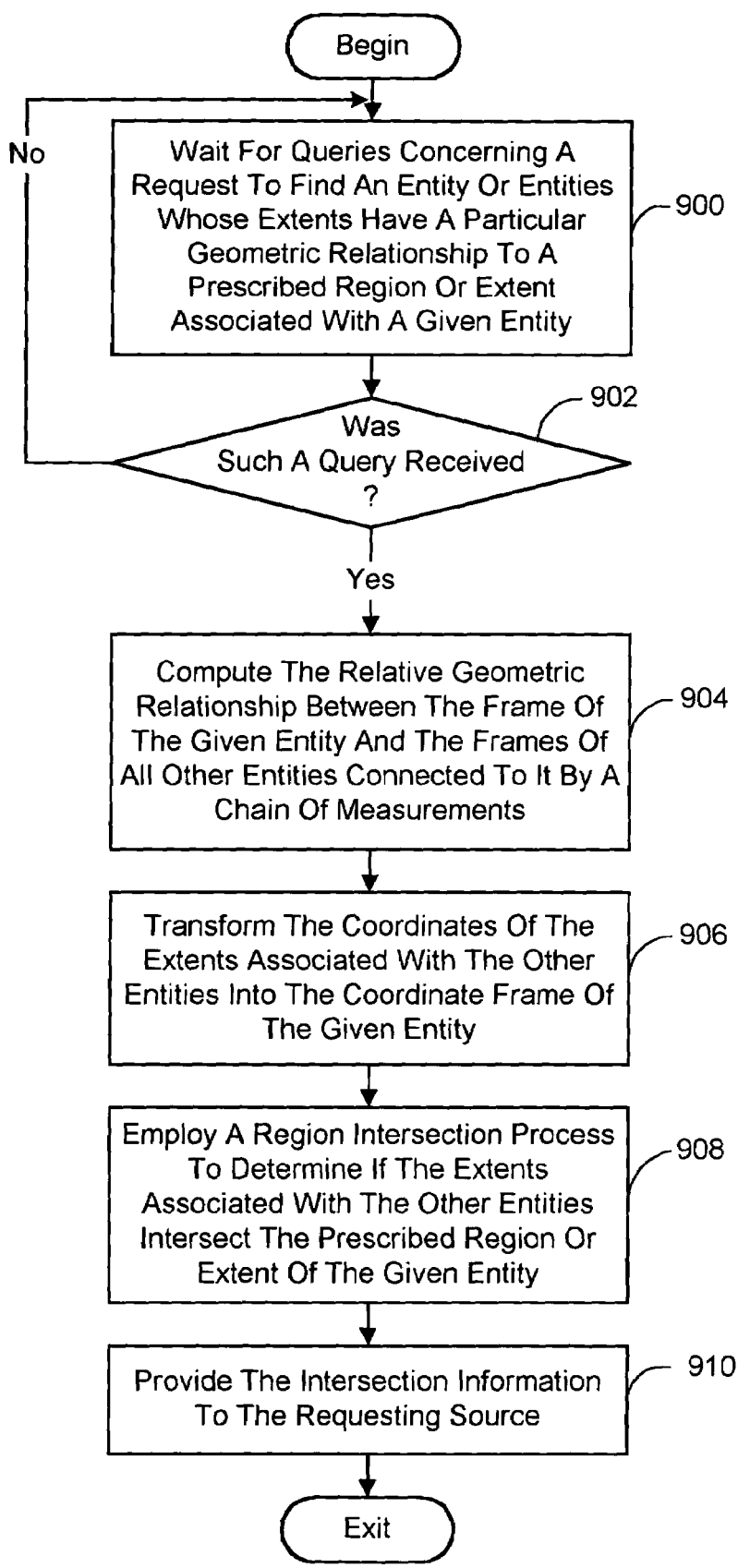
FIG. 9 is a flow chart diagramming process for responding to queries concerning a request to find an entity or entities whose extents have a particular geometric relationship to a prescribed region or extent associated with a given entity, in accordance with the response module of the overall process of FIG. 2.

The foregoing process for handling queries concerning a request to find an entity or set of entities whose extents have a particular geometric relationship to a prescribed region or extent associated with a given entity is summarized in the flow diagram of FIG. 9. The first action 900 of the process involves waiting for queries concerning the aforementioned request. Periodically, it is determined whether such a query was received as indicated in process action 902. If no query was received, the waiting and checking actions 900 and 902 are continued. If, however, such a query was received, then the relative geometric relationship is computed between the frame of the given entity and the frames of all other entities connected to it by a chain of measurements (process action 904). Next, the coordinates of the extents associated with these other entities are transformed into the coordinate frame of the given entity using the respective relative geometric relationships computed previously between the given entity and the other entities (process action 906). A region intersection process is then employed to determine if the extents associated with the other entities involved in the query intersect the prescribed region or extent associated with the given entity (process action 908). Finally, in process action 910 the intersection information (i.e. which entities along with optionally the region of intersection of each extent) is provided to the requesting source. The monitoring is continued and foregoing procedure repeated every time a new query of the aforementioned type is received.

Another interesting aspect of the last example is that even if there are overlapping extents, this does not mean that the person is actually facing toward the display screen. The purpose for the query may be that the querying program wants to display something intended for the person to see. This is where the aforementioned rotational coordinates used to indicate the "heading" of an entity could come into play. For instance, if the rotation component associated with the person indicates that the display screen would be in his or her field of view, then this would be reported. If not, then it could be reported to the querying program that the person could not see the display screen. The same procedure could be performed in the context of the display screen to ensure that it is oriented such that the person can see it.

It is noted that a query could be of a one-time or "one-shot" nature, or may be a standing query. For a one-time query, the querying program would request the desired geometric information and receive a one-time response. However, a standing query would be one predicated on some event, and every time this event occurred, a response to the query would be provided. For example, the previously discussed query concerning whether a person could clearly see a display screen might be requested to be responded to every time the person of interest is added to the geometric model of the environment (e.g., enters a room). It is also noted that because the environment is dynamic the response to such a query may have to be re-computed each time it is responded to, rather than relying on the previous response.

REFERENCES

[1] R. Smith, P. Cheeseman. "On the Representation and Estimation of Spatial Uncertainty". International Journal of Robotics Research, Vol. 5, No. 4, pp. 56–67, Winter 1986.
[2] P. Newman. "On The Structure and Solution of the Simultaneous Localisation and Map Building Problem". Ph.D Thesis, March 1999.

Wherefore, what is claimed is:

1. A computer-implemented process for providing a geometric model database for use in a ubiquitous computing environment to respond to queries about the environment's geometric state, comprising using a computer to perform the following process actions:

accepting information about the geometric state of the environment;

building a geometric model database of the environment based on an initial input of said information, comprising, establishing a set of entities that are of interest in the environment, each entity of which is represented by at least a coordinate frame unique to that entity and an extent, wherein said extent defines one of (i) the physical size of the entity, or (ii) the service region of the entity, characterizing the location of each entity in the environment in terms of the coordinate frame of at least one other entity, rather than in terms of a coordinate frame common to all entities, using a measurement defining the entity's relationship to at least one of said other entities, wherein said measurement comprises the position and orientation of each other entity's coordinate frame origin in terms of the coordinate frame of the entity under consideration and a spatial uncertainty estimate which is indicative of the accuracy of the method used to obtain the measurement, and wherein each measurement is provided to the geometric model database by an external source and more than one measurement defining an entity's relationship to another entity may be provided by separate external sources, and wherein the process action of characterizing the location of each entity in the environment relative to other entities using a measurement, further comprises, whenever more than one measurement defining an entity's relationship to another entity is received, combining said measurements using their relative uncertainties as weights;

maintaining the geometric model database by modifying it based on the input of updated information about the geometric state of the environment; and responding to queries concerning the geometric relationships between entities in the environment using the geometric model database.

2. The process of claim 1, wherein the process action of representing each entity by a coordinate frame and an extent, comprises a process action of characterizing an entity's extent as a point coincident with the origin of the entity's coordinate frame whenever an external source fails to provide information defining a size for the entity's extent.

3. A computer-implemented process for providing a geometric model database for use in a ubiquitous computing environment to respond to queries about the environment's geometric state, comprising using a computer to perform the following process actions:

accepting information about the geometric state of the environment;

building a geometric model database of the environment based on an initial input of said information, comprising, establishing a set of entities that are of interest in the environment, each entity of which is represented by at least a coordinate frame unique to that entity and an extent, wherein said extent defines one of (i) the physical size of the entity, or (ii) the service region of the entity, characterizing the location of each entity in the environment in terms of the coordinate frame of at least one other entity, rather than in terms of a coordinate frame common to all entities, using a measurement defining the entity's relationship to at least one of said other entities said characterizing comprising an action of revising the measurements comprising the actions of, inputting a spatial uncertainty estimate associated with each measurement which is indicative of the accuracy of the method used to obtain the measurement, identifying cycles of measurements among the measurements, wherein a cycle of measurements is defined as a string of measurements starting at the origin of a first entity frame in the cycle and following measurements from one entity to the next until reaching a last measurement in the cycle representing the relationship between the coordinate frame of a next to last entity of the cycle and the origin of said first entity frame, for each cycle identified, computing the difference between a given location of said first entity frame's origin and the location of that origin as indicated by following the chain of measurements making up the cycle, and computing revised measurements for the identified cycles by simultaneously adjusting the measurements based on their associated uncertainty estimates so as to make the given location of said first entity frame's origin in each of the identified cycles match the location of that origin as indicated by following the chain of measurements making up the cycle;

maintaining the geometric model database by modifying it based on the input of updated information about the geometric state of the environment; and responding to queries concerning the geometric relationships between entities in the environment using the geometric model database.

4. The process of claim 3, further comprising a process action of repeating the process actions of inputting spatial uncertainty estimates, identifying cycles of measurements, computing the difference between a given location of said first entity frame's origin and the location of that origin as indicated by following the chain of measurements making up the cycle for each cycle identified, and computing revised measurements, whenever new measurements are provided.

5. The process of claim 3, further comprising a process action of repeating the process actions of inputting spatial uncertainty estimates, identifying cycles of measurements, computing the difference between a given location of said first entity frame's origin and the location of that origin as indicated by following the chain of measurements making up the cycle for each cycle identified, and computing revised measurements, on a periodic basis.

6. A computer-implemented process for providing a geometric model database for use in a ubiquitous computing environment to respond to queries about the environment's geometric state, comprising using a computer to perform the following process actions:

accepting information about the geometric state of the environment;

building a geometric model database of the environment based on an initial input of said information, comprising, establishing a set of entities that are of interest in the environment, each entity of which is represented by at least a coordinate frame unique to that entity and an extent, wherein said extent defines one of (i) the physical size of the entity, or (ii) the service region of the entity, characterizing the location of each entity in the environment in terms of the coordinate frame of at least one other entity, rather than in terms of a coordinate frame common to all entities, using a measurement defining the entity's relationship to at least one of said other entities said characterizing comprising an action of detecting errors in the measurements, comprising the actions of,
(a) inputting a spatial uncertainty estimate associated with the measurement which is indicative of the accuracy of the method used to obtain the measurement,
(b) identifying cycles of measurements among the measurements, wherein a cycle of measurements is defined as a string of measurements starting at the origin of a first entity frame in the cycle and following measurements from one entity to the next until reaching a last measurement in the cycle representing the relationship between the coordinate frame of a next to last entity of the cycle and the origin of said first entity frame, and
(c) for each cycle identified,
computing the location of said first entity frame's origin as indicated by following the chain of measurements making up the cycle, along with computing an uncertainty region around the computed location of the origin based on a combination of the uncertainty estimates associated with each measurement in the cycle,
determining if a given location of said first entity frame's origin is within the computed uncertainty region,
whenever the given location falls outside the uncertainty region, declaring that at least one of the measurements in the cycle is incorrect, and
whenever it is declared that one of the measurements in the cycle is incorrect, disregarding these measurements and requesting that replacement measurements be provided
maintaining the geometric model database by modifying it based on the input of updated information about the geometric state of the environment; and
responding to queries concerning the geometric relationships between entities in the environment using the geometric model database.

7. The process of claim 6, further comprising a process action of repeating process action (c) whenever replacement measurements are provided.

8. The process of claim 6, further comprising a process action of repeating process action (c) periodically.

9. A computer-implemented process for providing a geometric model database for use in a ubiquitous computing environment to respond to queries about the environment's geometric state, comprising using a computer to perform the following process actions:
accepting information about the geometric state of the environment;
building a geometric model database of the environment based on an initial input of said information, comprising,
establishing a set of entities that are of interest in the environment, each entity of which is represented by at least a coordinate frame unique to that entity and an extent, wherein said extent defines one of (i) the physical size of the entity, or (ii) the service region of the entity,
characterizing the location of each entity in the environment in terms of the coordinate frame of at least one other entity, rather than in terms of a coordinate frame common to all entities, using a measurement defining the entity's relationship to at least one of said other entities said characterizing comprising an action of revising the measurements, comprising the actions of,
(a) inputting a spatial uncertainty estimate associated with each measurement which is indicative of the accuracy of the method used to obtain the measurement,
(b) identifying cycles of measurements among the measurements, wherein a cycle of measurements is defined as a string of measurements starting at the origin of a first entity frame in the cycle and following measurements from one entity to the next until reaching a last measurement in the cycle representing the relationship between the coordinate frame of a next to last entity of the cycle and the origin of said first entity frame,
(c) for each cycle identified,
computing the location of said first entity frame's origin as indicated by following the chain of measurements making up the cycle, along with computing an uncertainty region around the computed location of the origin based on a combination of the uncertainty estimates associated with each measurement in the cycle,
determining if a given location of said first entity frame's origin is within the computed uncertainty region,
whenever the given location falls outside the uncertainty region, declaring that at least one of the measurements in the cycle is incorrect, and
whenever it is declared that one of the measurements in the cycle is incorrect, disregarding these measurements and requesting that replacement measurements be provided, and
(d) computing revised measurements for those identified cycles in which the given location of the origin is not the same as its computed location but in which the given location falls within the uncertainty region by simultaneously adjusting the measurements based on their associated uncertainty estimates so as to make the given location of said first entity frame's origin in each of the identified cycles match the location of that origin as indicated by following the chain of measurements making up the cycle
maintaining the geometric model database by modifying it based on the input of updated information about the geometric state of the environment; and
responding to queries concerning the geometric relationships between entities in the environment using the geometric model database.

10. The process of claim 9, further comprising a process action of repeating process actions (a) through (d) whenever new measurements are provided.

11. The process of claim 9, further comprising a process action of repeating process actions (a) through (d) periodically.

12. A computer-implemented process for providing a geometric model database for use in a ubiquitous computing environment to respond to queries about the environment's geometric state, comprising using a computer to perform the following process actions:
accepting information about the geometric state of the environment;
building a geometric model database of the environment based on an initial input of said information, comprising, establishing a set of entities that are of interest in the environment, each entity of which is represented by at least a coordinate frame unique to that entity and an extent, wherein said extent defines one of (i) the physical size of the entity, or (ii) the service region of the entity, characterizing the location of each entity in the environment in terms of the coordinate frame of at least one other entity, rather than in terms of a coordinate frame common to all entities, using a measurement defining the entity's relationship to at least one of said other entities;

maintaining the geometric model database by modifying it based on the input of updated information about the geometric state of the environment; and responding to queries concerning the geometric relationships between entities in the environment using the geometric model database, said responding comprising, waiting for incoming queries from external sources for requests concerning the relative geometric relationship between two entities, whenever a request concerning the relative geometric relationship between two entities is received, determining if a direct measurement exists between the two entities involved in the request, whenever said direct measurement does not exist, employing a breadth-first search to find a measurement path between the two entities involved in the request that has the fewest number of measurement links, wherein a measurement path is a chain of measurements from a first of the two entities involved in the request, through at least one intermediate entity, to the other entity involved in the request, computing the requested measurement information using the measurements in said measurement path, if one was found, and providing the computed measurement information to the external source making the request.

13. The process of claim 12, wherein the process action of responding to queries concerning the geometric relationships between entities in the environment, further comprises, whenever as a result of employing the breadth-first search more than one measurement path is discovered having the same fewest number of measurement links, randomly choosing one of the discovered measurement path for use in computing the requested measurement information.

14. The process of claim 12, wherein the process action of using a measurement specifying the position and orientation of each other entity's coordinate frame origin in terms of the coordinate frame of the entity under consideration, comprises an action of assigning a spatial uncertainty estimate to the measurement which is indicative of the accuracy of the method used to obtain the measurement, and wherein the process action of responding to queries concerning the geometric relationships between entities in the environment, further comprises, whenever as a result of employing the breadth-first search more than one measurement path is discovered having the same fewest number of measurement links, choosing the discovered measurement path exhibiting a lowest combined uncertainty for use in computing the requested measurement information.

15. A computer-implemented process for providing a geometric model database for use in a ubiquitous computing environment to respond to queries about the environment's geometric state, comprising using a computer to perform the following process actions:

accepting information about the geometric state of the environment;

building a geometric model database of the environment based on an initial input of said information, comprising, establishing a set of entities that are of interest in the environment, each entity of which is represented by at least a coordinate frame unique to that entity and an extent, wherein said extent defines one of (i) the physical size of the entity, or (ii) the service region of the entity, characterizing the location of each entity in the environment in terms of the coordinate frame of at least one other entity, rather than in terms of a coordinate frame common to all entities, using a measurement defining the entity's relationship to at least one of said other entities;

maintaining the geometric model database by modifying it based on the input of updated information about the geometric state of the environment; and responding to queries concerning the geometric relationships between entities in the environment using the geometric model database, said responding comprising, inputting incoming queries from external sources for requests to find entities whose extents have a particular geometric relationship to a prescribed region or extent associated with a specified entity, ascertaining the relative geometric relationship between the frame origin of the specified entity and the frame origins of other entities, transforming the coordinates of the extents associated with the other entities into the coordinate frame of the specified entity using the respective relative geometric relationships between the frame origin of the specified entity and the frame origins of said other entities, employing a region intersection procedure to determine if the extents associated with said other entities intersect the prescribed region or extent associated with the specified entity, and providing information to the requesting source as to whether the extents of any of said other entities intersect the prescribed region or extent of the specified entity, and if so which of the other entities' extents intersect.

16. The process of claim 15, wherein the prescribed region or extent associated with the specified entity, as well as the extents associated with said other entities, are characterized by polygonal areas, or degenerated version thereof constituting a line segment or point, and wherein the region intersection procedure is a polygon intersection procedure.

* * * * *